United States Patent [19]
Coombs

[11] Patent Number: 6,059,853
[45] Date of Patent: *May 9, 2000

[54] PRODUCTION OF POWDER

[75] Inventor: Jeffrey Stuart Coombs, West Glamorgan, United Kingdom

[73] Assignee: Behr South Africa (PTY) Ltd., South Africa

[*] Notice: This patent is subject to a terminal disclaimer.

[21] Appl. No.: 09/017,895

[22] Filed: Feb. 3, 1998

Related U.S. Application Data

[63] Continuation of application No. 08/896,719, Jul. 18, 1997, Pat. No. 5,749,938, which is a continuation of application No. 08/495,477, Jul. 25, 1995, abandoned.

[30] Foreign Application Priority Data

Feb. 6, 1993 [GB] United Kingdom .................. 9302387
Feb. 4, 1994 [WO] WIPO .................... PCT/GB94/00219

[51] Int. Cl.⁷ .................. B22F 1/02; B05D 1/02
[52] U.S. Cl. .................. 75/332; 75/309; 75/327; 75/329; 75/337; 75/338; 427/216
[58] Field of Search .................. 75/309, 327, 329, 75/331, 332, 337, 338, 339; 427/215, 216

[56] References Cited

U.S. PATENT DOCUMENTS

| | | | |
|---|---|---|---|
| 3,963,811 | 6/1976 | Tamura et al. | 75/337 |
| 5,372,629 | 12/1994 | Anderson et al. | 75/332 |
| 5,749,938 | 5/1998 | Coombs | 75/337 |
| 5,876,794 | 3/1999 | Huet | 427/216 |

FOREIGN PATENT DOCUMENTS

| | | | |
|---|---|---|---|
| 63-206402 | 8/1988 | Japan | 75/332 |
| 5-331568 | 12/1993 | Japan | 75/309 |

OTHER PUBLICATIONS

*Condensed Chemical Dictionary*, Eighth Edition, Van Nostrand Reinhold Company, 1971, p. 397.

*ASM Handbook*, vol. 15, Casting, ASM, 1988, p. 6.

*Primary Examiner*—George Wyszomierski
*Attorney, Agent, or Firm*—Brown, Martin, Haller & McClain, LLP

[57] ABSTRACT

A method of producing coated powder material is provided. In the method, molten metal or metal alloy is caused to fall in a stream (3) and is then atomized into a spray. A liquid or solid material of different composition is introduced and caused to contact the stream or spray so that a coating is formed over all or part of the surface of the atomized droplets. The coating may be the introduced material or a reaction product.

12 Claims, 3 Drawing Sheets

PRODUCTION OF POWDER

CROSS REFERENCE TO RELATED APPLICATIONS

This application is a continuation of application Ser. No. 08/896,719, filed Jul. 8, 1997, now U.S. Pat. No. 5,749,938, which was a continuation of application Ser. No. 08/495,477, filed Jul. 25, 1995, abandoned.

BACKGROUND OF THE INVENTION

This invention relates to a method of producing coated powder material by atomization of a stream of molten metal or metal alloy. The powder preferably comprises wholly or partly coated particles.

In the art of gas atomization of molten metal it is known to introduce ceramic particles into the atomized spray for co-deposition with the atomized metal or metal alloy so as to form a composite deposit. For example, our United Kingdom Patents Nos. 1379261 and 2172827 disclose introducing solid particles into a spray deposit during the deposition operation.

In our International Patent Application published under No. WO89/05870 we also disclosed a method of producing a coherent deposit of an alloy by introducing into a base metal spray particles of a different material which form an alloying addition whereby, on co-deposition, an alloy deposit of the sprayed and introduced material is formed.

It is also known from United Kingdom Patent No. 1298031 to form irregular-shaped powder by injecting metal particles at a spray of molten droplets so that they agglomerate in flight. The injected particles remain solid otherwise the benefits of irregularity would not be achieved. The metal particles are of the same composition and are introduced at a pressure of about 2 barG and are of a fine particle size typically –65 mesh.

From European published Application No. 0262869 it is known to form composite powder where refractory material is introduced into a spray of molten metal so that the refractory material is uniformly distributed within the interior of the particles of the resultant powder.

SUMMARY OF THE INVENTION

An object of the present invention is to provide an improved powder material.

According to the present invention there is provided a method of producing coated powder material comprising introducing into an atomized stream or spray of molten and/or solidifying droplets of metal or metal alloy a material of different composition from the metal or metal alloy being sprayed, the introduced material being caused to contact the stream or spray of droplets so as to form a coating over all or part of the surface of the atomized droplets. The introduced material may be solid or liquid particles and may be of a single material or a mixture of materials. In the case of solid particles the particles melt on contact with the molten metal or metal alloy droplets to form the coating. The coating is facilitated due to a low contact angle between the introduced particles and the droplets which improves the wetting characteristics.

The introduced particles may be caused to impact the already formed molten droplets or may be introduced into the stream so as to become associated with the molten droplets on atomization of the molten metal or metal alloy. Where a mixture of solid particles is introduced these particles may react on contact with the molten metal or metal alloy to form a molten compound which due to its low contact angle will spread to completely or partially cover the surface of the atomized droplets. Alternatively, the introduced material may react with the metal or metal alloy or a constituent thereof to form the coating. Accordingly, the coating may comprise the introduced material or a reaction product thereof.

Where the introduced particles are solid the melting point of the introduced particles should be less than the temperature of the atomized droplets at the point of contact, while the size of the introduced particles must be small enough to ensure substantial melting upon contact with the atomized droplets. The size of the particulate is typically less than 10 microns but the exact size depends on the relative enthalpies of the materials used at the point of contact, for example, if the introduced particles are heated then their size may be increased.

To ensure that a coating is formed the injected materials used and/or the reacted products should be substantially insoluble in the molten metal or metal alloy.

In an alternative arrangement, a proportion of the injected particles may vaporize on contact with the molten metal or metal alloy droplets to form a vapour cloud. The coating comprises a thin film of the material deposited over the surface of the solidifying droplets as they pass through the cloud.

In the preferred arrangement of the present invention the injected particles may be introduced as disclosed in our co-pending application published under No. WO92/01525. However, by process control, the particles are caused to adhere to the surface of the atomized droplets and partially cover the surface by being caused to melt and/or react or react and/or melt and hence form a coating over all or part of the atomized droplet surface.

The invention also includes a method of producing coated metal or metal alloy powder comprising atomizing a stream of molten metal or molten alloy to form a spray of molten droplets, introducing into said stream or spray a molten or particulate material which is of different composition and is substantially immiscible and insoluble in said molten metal or metal alloy, contacting said material with the stream of molten metal or the molten and/or solidifying metal droplets of the spray such that a film of molten material spreads around the surface of the metal droplets, and solidifying the material and droplets during flight to form said coated metal or metal alloy powder.

The liquidus temperature of the introduced material is preferably no more than 100° C. lower than the liquidus temperature of the atomized metal or metal alloy and may be no more than 30° C. or 10° C. lower. In a preferred arrangement, the atomized material comprises Al/Si alloy and the coating is potassium aluminium fluoride. In this arrangement the coated powder may comprise a brazing material wherein the potassium aluminium fluoride provides a flux coating.

BRIEF DESCRIPTION OF THE DRAWINGS

The invention will now be described by way of example with reference to the accompanying drawings in which.

DETAILED DESCRIPTION OF THE INVENTION

Figure 4:
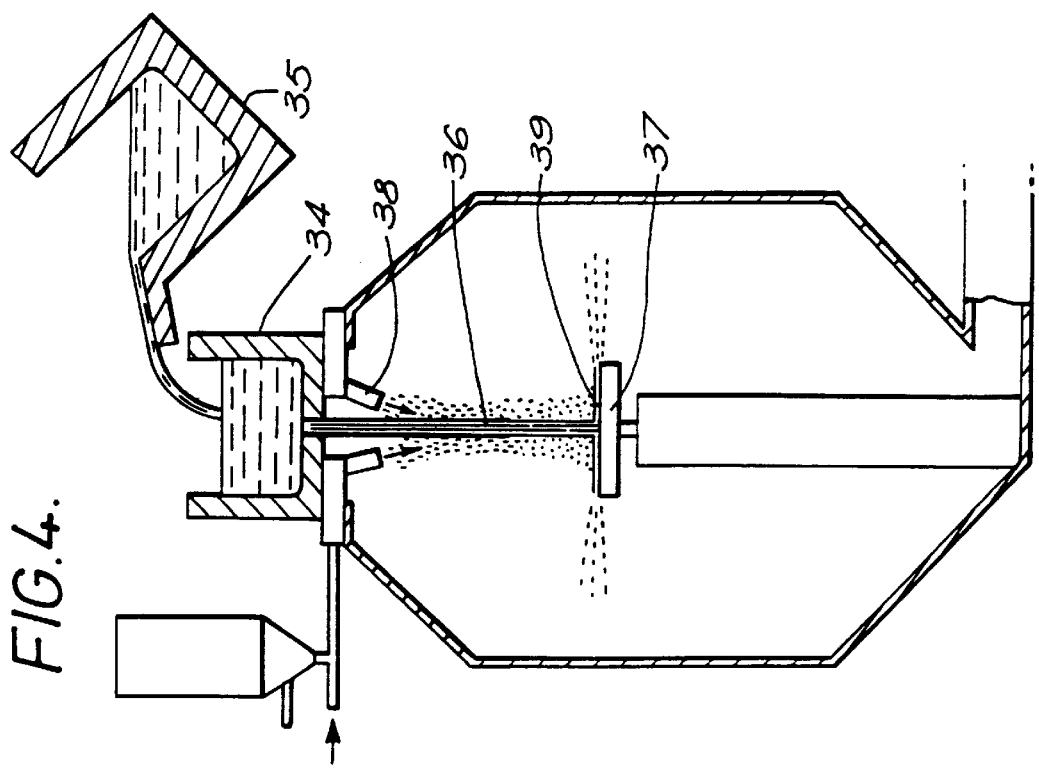
Figure 1:
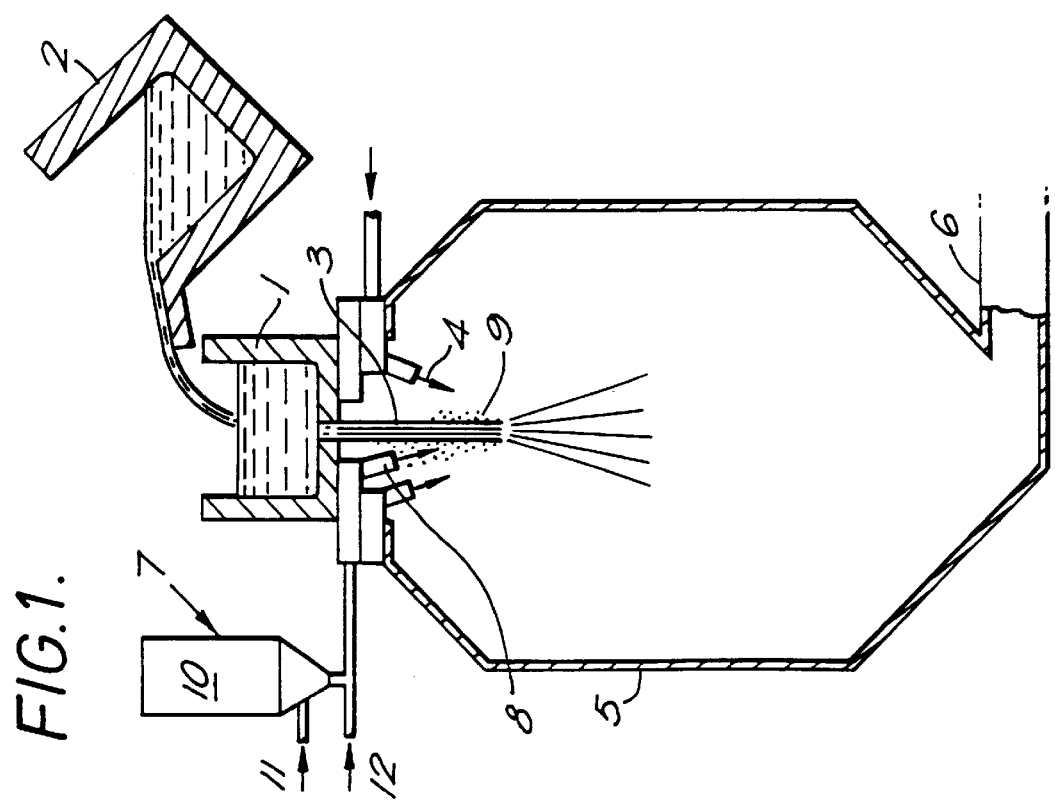
FIG. 1 is a diagrammatic view of a first embodiment of apparatus for carrying out the invention.
Figure 2:
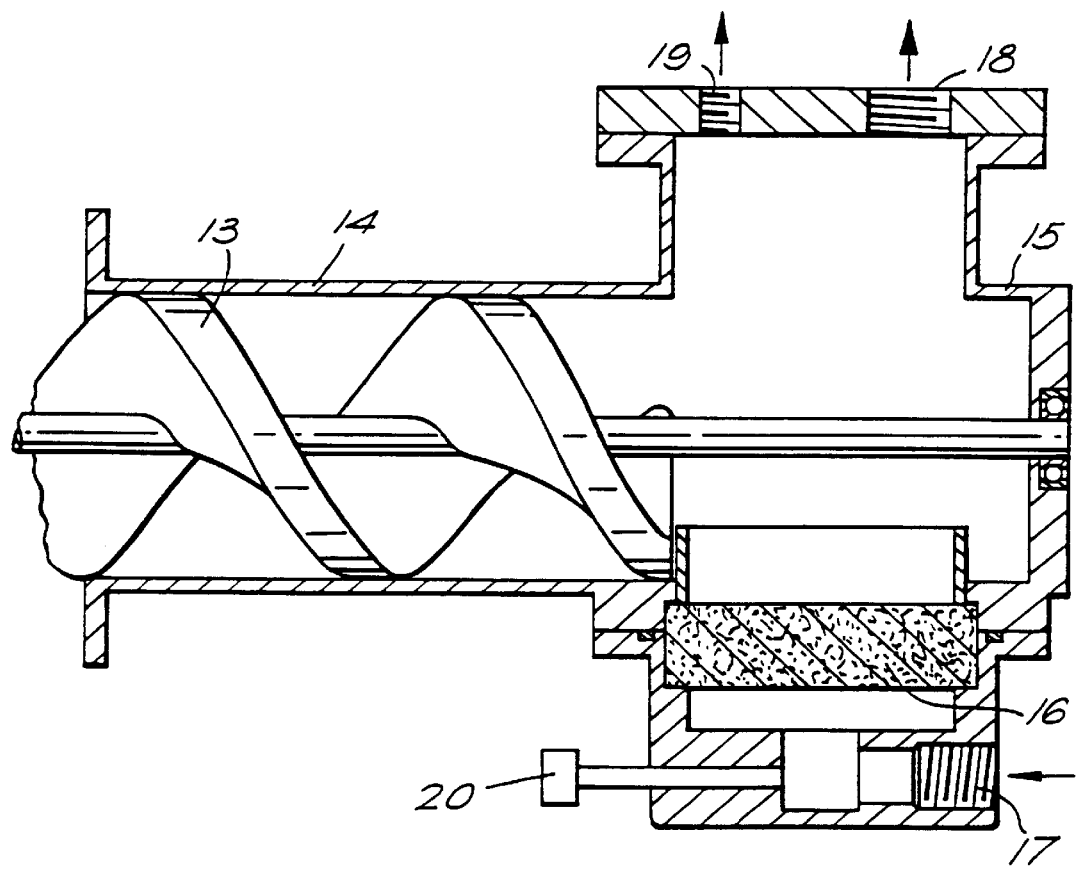
FIG. 2 is a side sectional view of an alternative particle feed.
Figure 3:
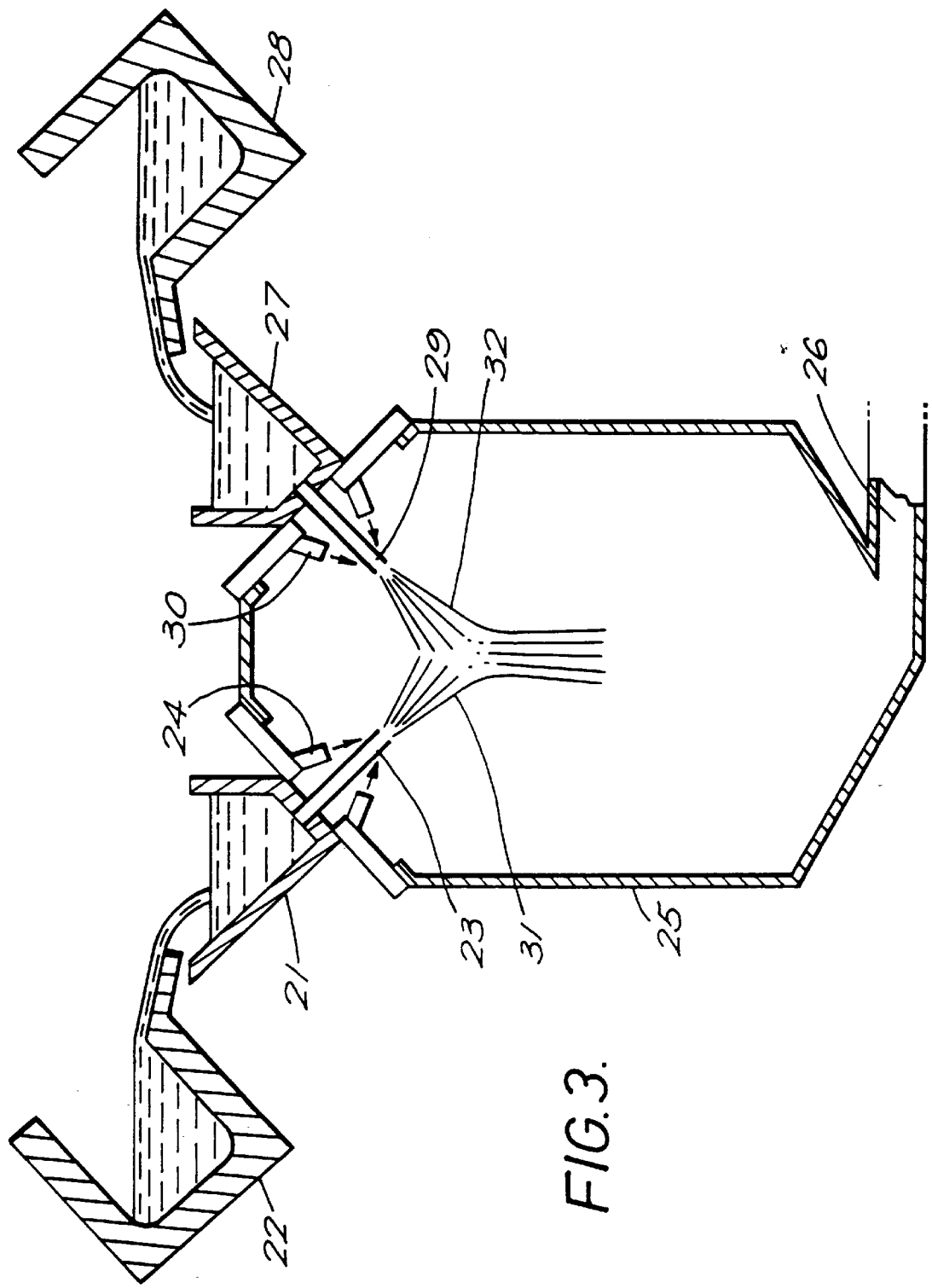
FIG. 3 is a diagrammatic view of a second embodiment of apparatus for carrying out the invention using a liquid feed; and, FIG. 4 is a diagrammatic view of a third embodiment of apparatus for carrying out the invention using centrifugal atomization.

In FIG. 1, apparatus for the formation of metal or metal alloy powder comprises a tundish (1) in which metal or metal alloy is held above its liquidus temperature. The tundish (1) receives the molten metal or metal alloy from a tiltable melting and dispensing furnace (2) and has a bottom opening so that the molten metal may issue in a stream (3) downwardly from the tundish (1) to be converted into a spray of atomized droplets by atomizing gas jets (4) within a spray chamber (5); the spray chamber (5) first having been purged with inert gas so that the pick-up of the oxygen is minimized. The atomizing gas extracts heat from the atomized droplets in flight so that solid powder is collected at the bottom of the spray chamber (5) and extracted through outlet (6).

In accordance with the invention, in order to coat the powder particles, an infection unit (7) is provided which is arranged to inject solid particles at nozzle (8) into atomizing zone (9) as the stream (3) breaks up into a spray. In order to improve mixing of the atomized droplets and the injected particles, a multi nozzle injection system may be used to inject the solid particulate into the atomizing zone. In FIG. 1 the injection unit (7) consists of a particle hopper (10), an inlet (11) for introducing fluidizing gas into the hopper (10) to fluidize the particles held in the container, and a supply of transport gas (12).

In the preferred method of the invention, the infected particles or mixture of particles are of a material having a solidus temperature less than the temperature of the molten droplets of the metal or metal alloy being sprayed at the instance of impacting the atomized droplets so that the introduced particles melt or melt and react to form a partial or complete coating on the solidifying atomized droplets. However, suitably, the melt temperature of the solid particles is very slightly different from that of the metal or metal alloy being sprayed (e.g. less than 10° C. difference) so that the particles, on melting, provide a coating (e.g. a flux coating). The required difference in temperature at impact is provided by superheat of the metal or metal alloy being sprayed and the temperature of the injected particles.

In the alternative arrangement shown in FIG. 2, instead of being fluidized, the solid particles are screw fed from the particle hopper (not shown in FIG. 2).

In this arrangement, a feed screw (13) extends horizontally from the bottom of the hopper and into a feed tube (14) from which the particles may be discharged into a mixing chamber (15). The discharge rate of particles into the mixing chamber (15) is controlled by the screw speed and can be varied as desired. A vibrator (not shown) may be provided at the hopper to ensure a steady flow of solid particles into the feed screw (13) from the hopper.

A vibrator may also be provided on the feed tube (14) to ensure that the solid particles do not compact during operation.

The mixing chamber (15) is mounted on the discharge end of feed tube (14). The chamber (15) includes a spreader plate (16) which is fed from the base by a transport gas inlet (17). The transport gas passes through the spreader plate (16) into the mixing chamber (15) and thence towards two exit ports (18) (only one showing) and carries with it solid particles exiting the feed tube (14). The exit ports (18) are positioned opposite the spreader plate (16) and solid particles exit in dilute phase flow with the transport gas. A third port (19) in the top of the mixing chamber is a pressure tapping to supply a feed control signal, as explained in our copending application No. WO92/01525. The apparatus may also include a purge control valve (20) for introducing purge gas into the system prior to operation.

As disclosed in WO92/01525, the solid particles may be introduced about the stream above the atomizing zone so as to combine with the droplets at atomization.

The quality of the coated powder is governed by control of:

(i) the melt temperature and flow rate of the metal being atomized;

(ii) the particle size, temperature and flow rate of the solid particles being introduced;

(iii) the atomizing device design;

(iv) the gas pressure and temperature of the atomizing gas and transport gas;

(v) the injector feed method; and, (vi) the mixing ratio and composition of injected particles where two or more materials are to be added in order to react on the droplet surface.

By monitoring and controlling these process variables, the particle size distribution of the atomized metal may be controlled to give the required surface area per unit mass; the ratio of liquid metal to injected particle; the efficiency of capture; the rate of cooling of the atomized metal droplets and the melting of the solid particles on impacting the atomized droplets.

As an alternative to the method shown in FIG. 1 where the introduced material is solid particulate, FIG. 3 shows apparatus for mixing liquid particles with a spray. In FIG. 3, apparatus for the formation of coated metal or metal alloy powder comprises a tundish (21) in which metal or metal alloy is held above its liquidus temperature. The tundish (21) receives the molten metal or metal alloy from a tiltable melting and dispensing furnace (22) and has a bottom opening so that the molten metal may issue in a stream (23) downwardly from the tundish (21). The stream (23) is converted into a spray of atomized droplets by atomizing gas jets (24) within a spray chamber (25); the spray chamber (25) first having been purged with inert gas so that the pick-up of the oxygen is minimized.

In accordance with the invention, in order to coat the metal or metal alloy powder there is provided a second tundish (27) in which the coating material is held above its liquidus temperature. The tundish (27) receives the molten coating material from a tiltable melting and dispensing furnace (28) and has a bottom opening so that the molten coating material may issue in a stream (29) downwardly from the tundish (27). The stream (29) is converted into a spray of atomized droplets by atomizing gas jets (30) within the spray chamber (25). The two spray (31,32) are then mixed in the spray chamber (25) to form the coated particles. The atomizing gas extracts heat from the atomized droplets of the metal or metal alloy and the coating material in flight so that solid coated powder is collected at the bottom of the spray chamber (25) and extracted through outlet (26).

As an alternative to using two sprays, the two liquids may be mixed in a single pouring nozzle or poured in such a way that they are both atomized together by a single atomizer. In this case the material with the lowest surface tension will form the coating material.

In FIG. 4, apparatus for the production of coated metal or metal alloy powder comprises a tundish (34) in which metal or metal alloy is held above its liquidus temperature. The tundish (34) receives the molten metal or metal alloy from a tiltable melting and dispensing furnace (35) and has a bottom opening so that the molten metal or alloy may issue in a stream (36) downwardly from the tundish (34). The stream (36) falls onto a high speed rotating disc (37) which causes the falling liquid metal stream (36) to be atomized as it is accelerated by centrifugal force from the periphery of the spinning disc (37). Using one of the injection methods mentioned previously, ie. the screw feeder or pneumatic powder injector—the pneumatic powder injector arrangement of FIG. 1 is illustrated by way of example—the coating material is introduced around the metal stream through nozzles (38) and directed towards the spinning disc (37) where they melt upon contact with the metal film (39) on the surface of the disc or melt upon contact with the molten metal or metal alloy droplets as they leave the spinning disc (37).

As an alternative to applying solid particles, two liquids may be mixed in the pouring nozzle or poured in such a way that they are co-atomized by the spinning disc to form the coated powder.

EXAMPLE

Using the apparatus disclosed in FIG. 1, an alloy based on aluminium silicon, e.g. Al-12 wt % Si alloy, can be atomized and the atomized droplets partially coated with 10 wt % of solid potassium aluminium fluoride by using the following parameters:

| | |
|---|---|
| Metal Flow Rate | 6 kg/minute |
| Metal Temperature | 660° C. |
| Particle Flow Rate | 0.75 kg/minute |
| Particle Temperature | 20° C. |
| Atomizing Gas | Nitrogen |

A 1:1 mixture of potassium fluoride and aluminium fluoride particles enter the atomizing zone of the Al-12 wt % Si and a substantial number melt and react on impact forming a partial coating of potassium aluminium fluoride.

Although the molten droplets of Al-12 wt % Si have superheat at the point of impact by the solid particles of potassium fluoride and aluminium fluoride, the temperature for the formation of the molten potassium aluminium fluoride is only very slightly different from the eutectic of the alloy, which is about 577° C. In this way, the potassium aluminium fluoride coating may provide a coating which protects the Al-12 wt % Si powder from oxidation on heating and which upon melting provides a flux which dissolves and disrupts the surface oxides in an aluminium brazing process.

If desired, although the potassium fluoride and aluminium fluoride particles may be introduced at room temperature, they may be preheated to improve the coating characteristics. For example, the pour temperature of the Al-12 wt % Si may be about 900° C. and the particle temperature 400° C. The potassium fluoride and aluminium fluoride material may comprise naturally occurring cryolite.

In a preferred arrangement we have therefore provided a powder comprising particles of Al-12 wt % Si at least partially coated on the surface with potassium aluminium fluoride.

Although we have described an Al-12 wt % Si powder coated with potassium aluminium fluoride, the invention is applicable to the production of any suitable coated powder. It is also envisaged that other brazing and soldering powder could be flux coated using this technique, including precious metal alloys (e.g. silver and gold alloys), nickel and copper-based brazing alloys, etc.

I claim:

1. A method of producing coated powder material comprising the steps of introducing into an atomized stream or spray of molten and/or solidifying droplets of metal or metal alloy a flux-forming material in molten or particulate form and which is of different composition and is substantially immiscible and insoluble in said molten metal or metal alloy being sprayed, contacting the introduced material with the stream or spray of droplets, and causing the introduced material to form a flux coating over all or part of the surface of the atomized droplets.

2. A method according to claim 1, wherein the introduced material is a single introduced material.

3. A method according to claim 2, wherein the flux coating comprises said introduced material.

4. A method according to claim 1, wherein the introduced material comprises a mixture of introduced materials which react on contact with the molten metal or metal alloy to form a reaction product comprising the flux coating.

5. A method according to claim 1, wherein the introduced material is liquid and the method of introduction comprises atomizing said material to form a spray of introduced droplets and contacting the spray of introduced droplets with the spray of metal or metal alloy droplets.

6. A method of producing flux coated metal or metal alloy powder comprising atomizing a stream of molten metal or metal alloy to form a spray of molten droplets, introducing into said stream or spray a molten or particulate material which is of different composition and is substantially immiscible and insoluble in said molten metal or metal alloy, contacting said material with the stream of molten metal or the molten and/or solidifying metal droplets of the spray, causing a film of molten material to spread around the surface of the metal droplets providing a flux for said metal, and solidifying the material and droplets during flight to form said flux coated metal or metal alloy powder, the introduced material being a liquid and the method of introduction comprising atomizing said material to form a spray of introduced droplets and contacting the spray of introduced droplets with the spray of metal or metal alloy droplets.

7. A method according to any of the claim 6, wherein the atomizing of the metal or metal alloy is selected from gas-atomizing or centrifugal atomizing.

8. A method according to claim 6, wherein the liquidus temperature of the introduced material is up to 100° C. lower than the liquidus temperature of the molten metal or metal alloy.

9. A method according to claim 8, wherein the liquidus temperature of the introduced material is up to 30° C. lower than the liquidus temperature of the molten metal or metal alloy.

10. A method according to claim 8, wherein the liquidus temperature of the introduced material is no more than 10° C. lower than the liquidus temperature of the molten metal or metal alloy.

11. A method of producing flux coated metal or metal alloy powder comprising atomizing a stream of molten metal or metal alloy to form a spray of molten droplets, introducing into said stream or spray a molten or particulate material which is of different composition and is substantially immiscible and insoluble in said molten metal or metal alloy, contacting said material with the stream of molten metal or the molten and/or solidifying metal droplets of the spray, causing a film of molten material to spread around the surface of the metal droplets providing a flux for said metal, and solidifying the material and droplets during flight to form said flux coated metal or metal alloy powder, the introduced material and the coating formed comprising potassium aluminum fluoride.

12. A method of producing coated powder material, comprising the steps of:

atomizing a stream of molten metal or metal alloy in an atomization zone to form a spray of molten droplets;

simultaneously introducing a molten or particulate material into the stream or spray in the atomization zone;

the introduced material being of different composition from the molten metal or metal alloy, and being substantially immiscible and insoluble in said molten metal or metal alloy, and being inert to said metal or metal alloy;

contacting said material with the stream of molten metal or the molten and/or solidifying metal droplets of the spray in the atomization zone;

causing the introduced material to at least partially melt whereby a film of molten material spreads around the surface of the metal droplets providing a flux for said metal; and solidifying the material and droplets during flight to form said flux coated metal or metal alloy powder.

* * * * *